P. M. MUELLER.
ELECTRIC HEATING ELEMENT CONTROLLING DEVICE.
APPLICATION FILED MAR. 24, 1920.
1,395,002.
Patented Oct. 25, 1921.
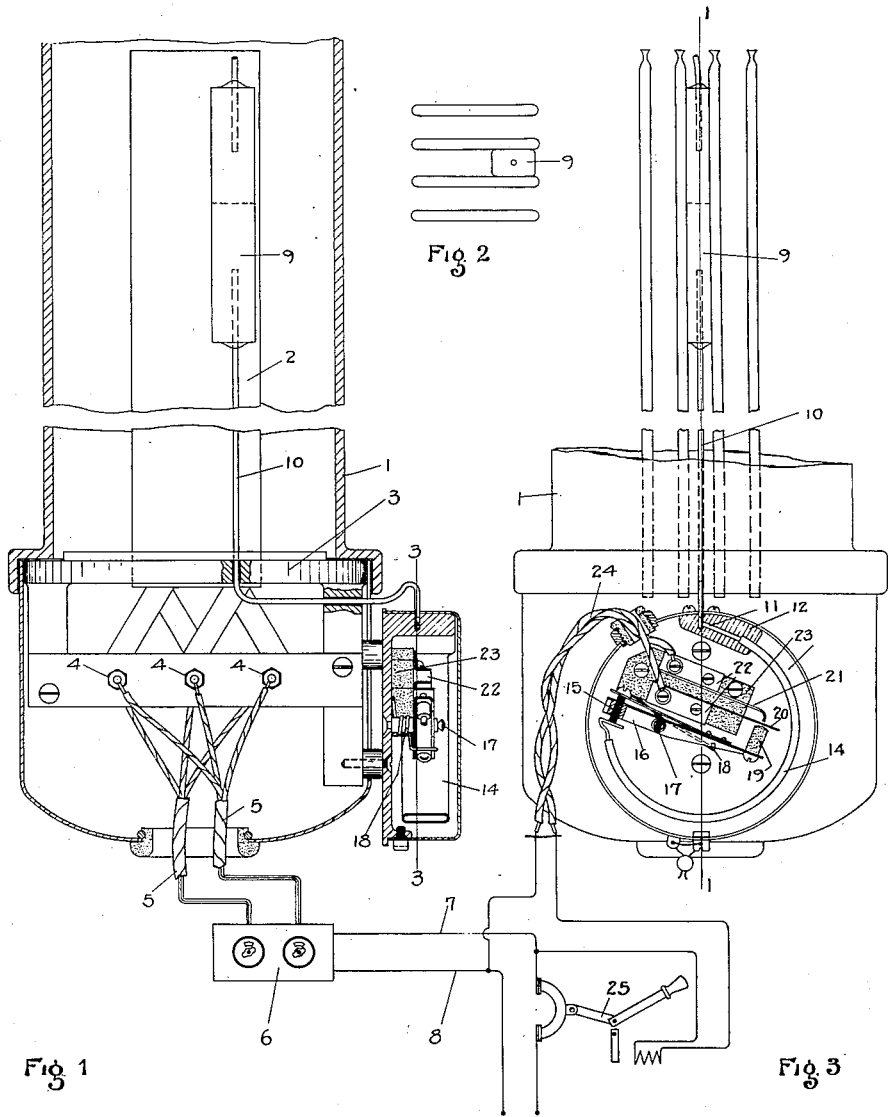

UNITED STATES PATENT OFFICE.

PAUL M. MUELLER, OF ERIE, PENNSYLVANIA, ASSIGNOR TO AMERICAN STERILIZER COMPANY, OF ERIE, PENNSYLVANIA, A CORPORATION OF PENNSYLVANIA.

ELECTRIC-HEATING-ELEMENT-CONTROLLING DEVICE.

1,395,002.

Specification of Letters Patent.   Patented Oct. 25, 1921.

Application filed March 24, 1920.   Serial No. 368,248.

*To all whom it may concern:*

Be it known that I, PAUL MANNING MUELLER, a citizen of the United States, residing at Erie, in the county of Erie and State of Pennsylvania, have invented new and useful Improvements in Electric-Heating-Element-Controlling Devices, of which the following is a specification.

In the use of heating elements especially where they are used for heating liquids the elements are apt to be injured by over-heating if the level of liquid falls sufficiently to uncover the heating element. In order to control the current leading to the heating element I provide a generator having a fluid such as water and utilize the variations in pressure in this generator to actuate devices for controlling the current. Where an indicator pressure coil is used in actuating the controlling device the coil is injured provided it does not have a free opportunity to expand under pressure. I prefer to use such a coil and to so arrange the controlling device that it may expand indefinitely under the pressure because even after the current is cut off there is sufficient heat to run the pressure up in the generator to a considerable amount.

The invention is illustrated in the accompanying drawings as follows:—

Figure 1 is a section on the line 1—1 in Fig. 2.

Fig. 2 an end view of the heating element.

Fig. 3 a side elevation, a part being in section on the line 3—3 in Fig. 1.

1 marks the fluid receptacle, 2 the heating element made up of several units, the coils of which lead to the terminals 4 and the terminals are connected through the wires 5, switch 6 with the main source of current through the wires 7 and 8. I arrange a generator 9 between two of the units. This is simply in the form of a small receptacle in which some fluid such as water is arranged. A tube 10 leads from the receptacle to a passage 11 in a block 12 of a switch controlling a shunt circuit from the main line. The block 12 is mounted on a base 13 and a pressure coil 14 is secured in the block 12 and connected with the passage 11. The coil rests normally on a screw 15 arranged in the end of a lever 16. The lever is mounted on a pin 17 extending from the base. A spring 18 is coiled around the pin and presses one end of the lever against the coil 14 and the insulating block 19 at the opposite end in a direction to move the movable element 20 of a switch into contact with the stationary element 21 of said switch. The sides of the switch 20—21 are connected to the plates 22 mounted on a block 23 secured to the frame. The brackets 22 are connected by the wires 24 to the main circuit wires 7 and 8 and a circuit breaker 25 operating on the main line 7 is actuated when the circuit through the wires 24 is closed by closing the switch 20—21.

When the pressure in the generator reaches a predetermined pressure it operates the coil 14 expanding the coil and releases the lever 16. The spring 18 then forces the lever forward so as to operate the element 20 and close the switch. Current is received through the circuit formed by the wires 24 a sufficient length of time to operate the circuit breaker when the current is cut off both to the heating element and through the circuit formed with the wires 24.

I have shown a generator of rectangular cross section and which has a heating surface bearing a constant ratio to the included volume of water or liquid regardless of the level of the water or liquid. For this reason a given change of temperature in the heating element produces a given response in the generator. There may be a slight difference in the lag but the practical results remain the same. The generator, therefore, should be made so as to keep these factors in the relation here shown because if they are varied from and the level of liquid changes a given change in the heating element would not be followed up by a like response in the pressure. Of course, the generator will eventually reach the temperature of the heating element under almost any condition but if the heating surface varies with relation to the volume of water to be heated to any great extent the lag for practical purposes will be prohibitive.

What I claim as new is:—

1. In an electric heating element controlling device, the combination of a heating element; a pressure generator in contact with the heating element; and devices actuated by the pressure from the generator controlling the current of the heating element.

2. In an electric heating element controlling device, the combination of a heating element; a fluid receptacle in which the heating element is arranged; a pressure generator in contact with the heating element; and a device actuated by pressure from the generator controlling the current of the heating element.

3. In an electric heating element controlling device, the combination of a heating element; a generator subjected to heat from the heating element; a pressure device connected with the generator; and a controlling device held out of action by the pressure device up to a predetermined pressure, said controlling device acting when released to control the current of the heating element.

4. In an electric heating element controlling device, the combination of a heating element; a thermally sensitive controlling mechanism subjected to heat from the heating element; a main circuit leading to the heating element; a controlling circuit leading from the main circuit; a circuit breaker in the main circuit; and means controlled by the thermally sensitive controlling mechanism acting on the controlling circuit to actuate the circuit breaker, said action breaking the controlling circuit.

5. In an electric heating element controlling device, the combination of a heating element; a pressure generator in contact with the heating element, said generator having a heating surface corresponding to the volume in the generator throughout the varying levels which a contained liquid may have; and devices actuated by the pressure from the generator controlling the current of the heating element.

In testimony whereof I have hereunto set my hand.

PAUL M. MUELLER.